United States Patent [19]

van der Meer et al.

[11] Patent Number: 4,924,306

[45] Date of Patent: May 8, 1990

[54] METHOD OF AND DEVICE FOR ESTIMATING THE EXTENT OF MOTION IN A PICTURE ELEMENT OF A TELEVISION PICTURE

[75] Inventors: Jan van der Meer; Kiran Varshneya-Rohra; Franciscus W. P. Vreeswijk, all of Eindhoven, Netherlands

[73] Assignee: U.S. Philips Corporation, New York, N.Y.

[21] Appl. No.: 313,660

[22] Filed: Feb. 21, 1989

[30] Foreign Application Priority Data

Feb. 23, 1988 [NL] Netherlands ................. 8800452

[51] Int. Cl.$^5$ ............................................. H04N 7/137
[52] U.S. Cl. ...................................... 358/105; 358/136
[58] Field of Search ................................. 358/105, 136

[56] References Cited

U.S. PATENT DOCUMENTS

| | | | |
|---|---|---|---|
| 4,240,101 | 12/1980 | Michael | 358/140 |
| 4,240,106 | 12/1980 | Michael | 358/167 |
| 4,240,109 | 12/1980 | Michael | 358/105 |
| 4,661,853 | 4/1987 | Roeder | 358/105 |
| 4,796,087 | 1/1989 | Guichard | 358/105 |
| 4,802,005 | 1/1989 | Kondo | 358/105 |

*Primary Examiner*—Howard W. Britton
*Attorney, Agent, or Firm*—Edward W. Goodman

[57] ABSTRACT

A motion estimation for a picture element (pixel) (P1) of a television picture (TP) is performed at pixel level by comparison of the picture signal value of the present pixel (P1) with that of a corresponding pixel (P1) in a previous and/or subsequent television picture and with that of a plurality of surrounding pixels (P2', P3', P4', P5') in the present picture. Dependent on whether a threshold value is exceeded, it is decided whether there is no motion or whether there is motion. In the comparison with the surrounding pixels, an OR function is present for the detection "no motion". It is assumed that a first and a second comparison result "no motion" associated with the pixel-pixel comparison and with the pixel-group comparison are stored for pixels (P) of the television picture (TP). Subsequently, the first and second comparison results in a sub-region (MA1) associated with the present pixel (P1) with a matrix of pixels (P1 ... P64) are processed in accordance with a relation in which the quotient of the number of pixels (P) in the subregion (MA1) signifying "no motion" and the total number of pixels (P1 ... P64) in the sub-region (MA1) is larger than an associated first and second threshold number, respectively, which is a part of the total number. At this sub-region level a decision is made about the extent of motion at the present pixel (P1), dependent on the combinations of the first and second threshold numbers being exceeded or not exceeded.

7 Claims, 3 Drawing Sheets

METHOD OF AND DEVICE FOR ESTIMATING THE EXTENT OF MOTION IN A PICTURE ELEMENT OF A TELEVISION PICTURE

BACKGROUND OF THE INVENTION

The invention relates to a method of estimating the extent of motion in a picture element (pixel) of a television picture, the method being based on picture signal value comparisons between pixels in successive television pictures in which, starting from the present pixel in the television picture, the picture signal value of this pixel is compared with that of a corresponding pixel in the previous and/or subsequent television picture and with that of a plurality of surrounding pixels in the present television picture, and in which the extent of motion at the present pixel is established dependent on a number of comparison results exceeding or not exceeding a threshold value, the number being obtained by means of the picture signal value comparisons.

The invention also relates to a device suitable for performing such a method.

A motion estimation per pixel of a television picture may be utilized for many purposes. In the case of a television transmission channel having a bandwidth which is more limited than that of the television signal source, the motion estimation may be used for bandwidth reduction. When converting a television signal from one to another standard, the motion estimation can be used for obtaining a better picture quality in the display of the converted picture signal. Furthermore, the motion estimation can be used for the motion compensation in the case of a moving television camera.

SUMMARY OF THE INVENTION

It is an object of the invention to realize a motion estimation method whose simplicity leads to an estimation which is optimal in practice. To this end, a method according to the invention is characterized in that the comparison result signifying no motion or motion, obtained in the comparison of the present pixel and the corresponding pixel, and the comparison results at least one of which signifies no motion or all of which signify motion, obtained in the comparison of the present pixel and at least the plurality of surrounding pixels are stored as a first and a second comparison result signifying no motion and motion, respectively, for pixels of the television picture, the first and the second comparison result signifying no motion and motion, respectively, of pixels being present in at least one sub-region with a matrix of a plurality of adjacent, superjacent and subjacent pixels at the present pixel being processed in accordance with a relation in which the quotient of the number of pixels in the sub-region with the first and the second comparison result, if both results signify no motion and motion, respectively, and the total number of pixels in the relevant sub-region is larger or smaller than a first and a second threshold number, respectively, which is a part of the said total number, while a decision is made about the extent of motion at the present pixel dependent on the combinations of the first and the second threshold number being exceeded or not exceeded.

An extension of the number of combinations is realized in an embodiment of the method according to the invention which is characterized in that the method is performed for at least another, larger plurality of surrounding pixels, leading to at least a third comparison result, a sub-region processing with at least a third threshold number and an extension of the combinations by at least one further combination.

The invention is based on the recognition that an optimum estimation can be obtained by firstly applying a low threshold for the first, second, third, etc. comparison result signifying no motion. Associated therewith is the OR function for the comparison of the present pixel with the surrounding pixels; in the case of a single pixel leading to the decision signifying no motion, this decision applies to all surrounding pixels. Secondly, when forming the combination indicating the extent of motion, a high threshold for the decision signifying no motion can be applied. In practice, the result is found to be an optimum estimation of the motion due to the possibility of the low limit signifying no motion at pixel level, on the one hand, and the high limit signifying no motion at sub-region level, on the other hand. The reverse applies to the detection signifying motion.

An embodiment of the method according to the invention having a low limit suitable in practice, signifying no motion at pixel level, is characterized in that the comparison results are obtained by means of a threshold value which is of the order of 0.01 to 0.5 of the peak-to-peak value of the picture signal.

An embodiment of the method using a differentiation at the high limits signifying no motion at sub-region level is characterized in that the threshold numbers, which are parts of the total number and are associated with the first, second, etc. comparison results signifying no motion or motion, are larger or smaller, respectively, in that sequence.

A further practical embodiment is characterized in that the threshold numbers in the sequence are of the order of 0.9, 0.95, 0.97, 0.98, etc. and 0.1, 0.05, 0.03, 0.02, etc., respectively.

A device for performing the method according to the invention, comprising at least one memory device for storing or delaying the picture signal values of the pixels of a television picture, and at least a first and a second signal comparison-and-threshold circuit coupled to the memory device for performing the picture signal value comparisons between the present pixel, the corresponding pixel and the plurality of surrounding pixels, respectively, is characterized in that the device comprises a further memory device which is coupled to outputs of at least the first and second signal comparison-and-threshold circuits for storing at least the first and second comparison results, respectively, per pixel, said further memory device having at least a first and a second group of a number of outputs associated with the matrix of the pixels of the sub-region, said at least first and second groups of outputs being coupled to at least a first and a second accumulator circuit, respectively, for each time accumulating the number of pixels signifying no motion and signifying motion, respectively, respective outputs of said accumulator circuits being coupled to a third and a fourth comparison-and-threshold circuit, respectively, operating in accordance with the relation, at least one output of the third comparison-and-threshold circuit and one output of the fourth comparison-and-threshold circuit conveying the said combination as a code.

An embodiment of the device in which the previous television picture as well as the subsequent one are utilized for the method according to the invention is characterized in that the first-mentioned memory device is suitable for supplying the picture signal values of the pixels of the previous and the subsequent television picture and in that device for the two television picture processing operations is duplicated with the first memory device and at least in part with the circuits, the duplicate parts of the device being coupled by a logic OR function for both the first and the second comparison result.

BRIEF DESCRIPTION OF THE DRAWINGS

The invention will now be described in greater detail, by way of example, with reference to the accompanying drawings in which.

DESCRIPTION OF THE PREFERRED EMBODIMENT

Figure 1:
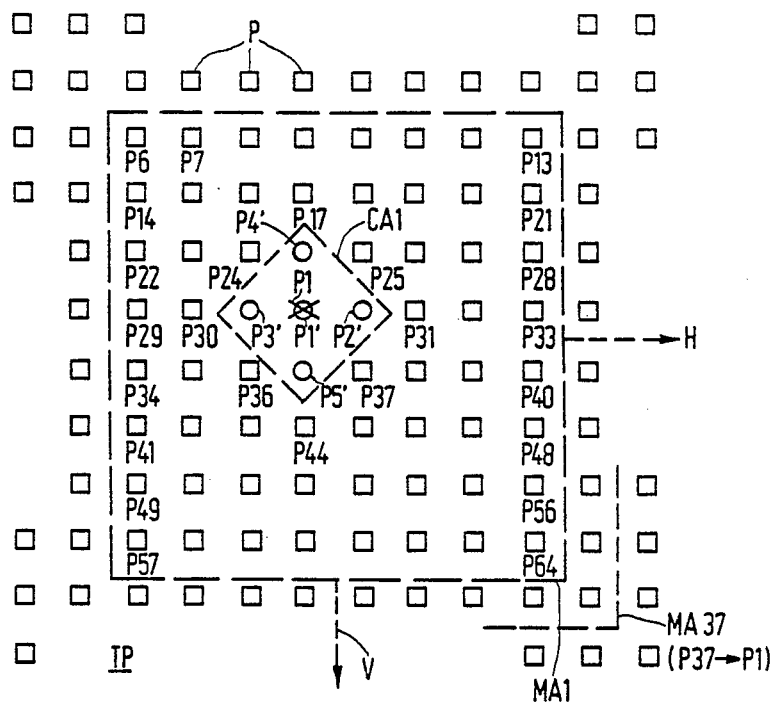
FIG. 1 is associated with a part of television pictures comprising pixels shown diagrammatically.

FIG. 1 shows a part of television pictures TP with pixels P and P' shown diagrammatically. The squares P denote pixels of a given television picture TP. The circle P' denote further pixels of another previous or subsequent television picture TP. A cross P1 denotes a given pixel in the given television picture TP with the further pixels P1'. The pixel P1 is the instantaneous pixel for which the motion estimation will be described. Two groups of pixels are associated with the pixel P1. The first group comprises in a region CA1 a number of pixels P2', P3', P4' and P5' surrounding the pixel P1 and a pixel P1' corresponding to the pixel P1, all from the other television picture. If there is no line interlacing in the television pictures TP, one field with lines of pixels is associated with each picture TP. In FIG. 1 the reference H denotes the horizontal or line scan direction. In the case of noninterlacing, a picture period PT is identical to one field period. In the case of single or multiple line interlacing each picture or frame period PT comprises two or more field periods, denoted by VT. In FIG. 1, the reference V denotes the vertical, picture or frame and field scan direction. For the description of FIG. 1 it is ignored whether line interlacing is present or not present in the television pictures TP.

A second group of pixels P associated with the pixel P1 is present in a sub-region MA1 comprising a matrix of the pixel P1 and a plurality of adjacent, superjacent and subjacent pixels P. A matrix of $8 \times 8$ pixels P1 to P64 is given by way of example. For the sake of completeness, it is to be noted that the pixels P1, P2, P3, P4 and P5 are not shown in the square form in the matrix shown. The sub-region MA1 is associated in the manner described with the pixel P1. The reference MA37 denotes a sub-region which is shifted by one pixel P with respect to the sub-region MA1 shown in the directions H and V, this sub-region being associated with the pixel P37 shown in FIG. 1 if it is, in turn, considered as the pixel P1 for which the motion estimation is to be carried out.

The method according to the invention will be described with reference to FIG. 1, assuming that the picture signal values are present in a digitized form, for example with 8 bits. The picture signal value associated with the pixel P1 of the instantaneous television picture TP is compared with that associated with the corresponding pixel P1' of the other television picture. With respect to a given threshold value th1, which is, for example, of the order of 0.01 to 0.5 of the peak-to-peak value of the picture signal, it is decided whether there is no motion or whether there is motion at the difference value which is smaller or larger, respectively, than the threshold value th1. This comparison result corresponds, for example, to a logic 0 or 1, respectively. In a similar way the picture signal value associated with the pixel P1 is separately compared with that of the surrounding pixels P2', P3', P4' and, P5' of the other television picture and with respect to the same (th1) or a different threshold value th2, no motion (0) or motion (1) is decided upon for each pixel comparison, while it holds for the group that one decision signifying no motion (0) leads to the same comparison result (0) for the whole group. In this case, there is a logic OR function for the detection of no motion (0) and a logic AND function for the detection of motion (1). The comparison results of the pixel-pixel comparison and the pixel-group comparison are stored as a first comparison result CR1 and as a second comparison result CR2, respectively, for the pixel P1. The first and second comparison results CR1 and CR2 are stored for each pixel P of the instantaneous television picture TP. For the threshold value th, it is to be noted that the smallest value of approximately 0.01 is determined, for example by the noise content of the picture signal and that the largest value of 0.5 of the peak-to-peak value of the picture signal can be chosen when a very low threshold or limit for the decision signifying "no motion" is desired.

Subsequently, the comparison results CR1 and CR2 are obtained at pixel level, combined with each other at sub-region level, i.e. the results of the pixels P1 to P64 are processed in accordance with a given relation through which the extent of motion at the pixel P1 is ultimately decided upon. Then the sum is determined of the number of pixels in the sub-region MA1 for which no motion ($\Sigma 0$) or motion ($\Sigma 1$) is decided upon and this separately for the two comparison results CR1 and CR2. This relation implies that the quotient of the obtained addition and the total number of pixels P1 to P64 is compared with a threshold number thn which is a part of this total number. In the case of the addition "no motion", the quotient must be larger than the threshold number thn, and in the case of the addition "motion" the quotient must be smaller than (1-thn), if thn is between the values 0 and 1. Starting from a threshold number thn1 for the first comparison result CR1 and from a threshold number thn2 for the second comparison result CR2, the extent of motion of the pixel P1 is decided upon dependent on the combinations of the first and second threshold numbers thn1 and thn2 being exceeded or not exceeded.

Figure 2:
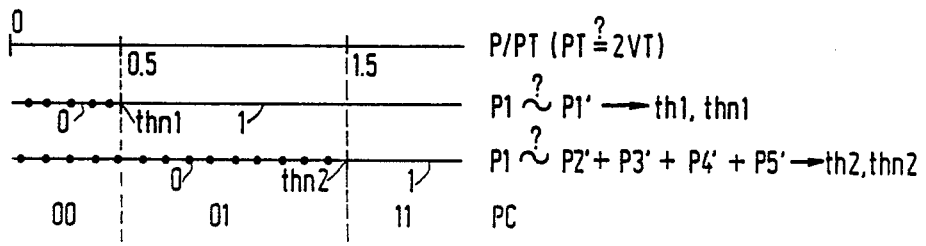
FIG. 2 shows some diagrams to illustrate the extent of motion of a pixel per picture or frame period and the associated code combination.

To elucidate the method described with reference to FIG. 1, reference is made to FIG. 2. In FIG. 2 the described pixel-pixel comparison is illustrated by means of P1 ≟ P1'. th1, thn1. The swung dash (~) and the question mark (?) illustrate the comparison with which the threshold value th1 is associated, whereafter the comparison is effected per sub-region with the threshold number thn1 in accordance with the relation. FIG. 2 shows that a logic 0 is present below the threshold number thn1 and a logic 1 is present above it. FIG. 2 also shows an associated diagram P/PT indicating the pixel P motion per picture period PT. The threshold number thn1 is associated with the value 0.5 in the diagram P/PT. The reference (PT $\overset{?}{=}$ 2VT) indicates that the picture period PT in the case of a non-interlaced picture is associated with "no" and that PT=2VT with single interlacing is associated with "yes". The value 0.5 emanates from the digitized state of the picture signal values at the sampling frequency associated with the pixels P.

FIG. 2 shows a diagram P1 $\overset{?}{=}$ P2'+P3'+P4'+P5'→th2, thn2 with the logic 0 and 1 for the described pixel-group comparison. The + symbol indicates the OR function. The threshold number thn2 corresponds to 1.5 in the diagram P/PT due to the choice of the limit of the region CA1 of FIG. 1 between the adjacent pixel at the pixel P1 and the subsequent pixel. The half part emanates from the digital character of the picture signal.

In FIG. 2 the reference PC denotes the resultant code combinations 00, 01 and 11 associated with no motion (smaller than 0.5 pixel P per picture period PT), some motion (between 0.5 and 1.5 pixel P per picture period PT), and more motion (larger than 1.5 pixel P per picture period PT). The extent of motion per pixel is determined at three motion levels.

Figure 3:
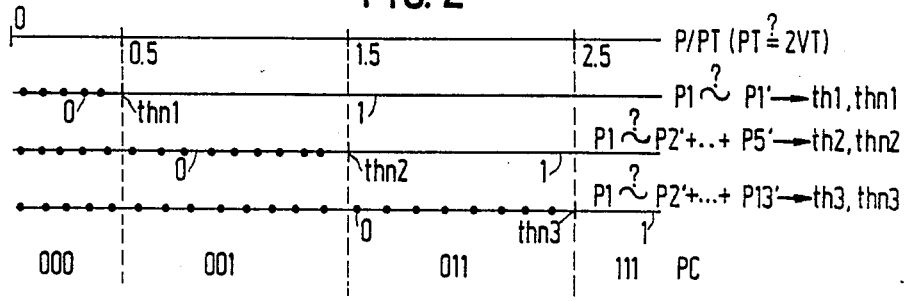
FIG. 3 is identical to FIG. 2 with a code combination on a larger scale.

FIG. 3 is associated with a motion estimation having four motion levels. This Figure shows that in the manner described, the threshold numbers thn1 and thn2 correspond to 0.5 and 1.5 pixel P, respectively, per picture period PT. It is assumed that the region CA1 of FIG. 1 is extended by the contiguous pixels P17, P24, P25, P30, P31, P36, P37 and P44, leading to an extension by 8 pixels P'. The result is a pixel-group comparison of the pixel P1 with the group P2'+. . P5'+. . +P13'. A third comparison result CR3 is obtained via a threshold value th3 while the three comparison results CR1, CR2, and CR3 are stored per pixel P. Subsequently, there is the sub-region processing operation with a third threshold number thn3, which number corresponds to 2.5 in the diagram P/PT. The result is that the extent of motion at each pixel P is given by one of the following code combinations 000, 001, 011 and 111 (even more motion). Instead of using all 12 pixels for the plurality of surrounding pixels a choice could be made, e.g. the 8 pixels P17, P24, P25, P30, P31, P36, P37 and P44 or 4 pickels P17, P30, P31 and P44. Other combinations are also possible.

FIG. 1 shows that the comparison region CA1 amply falls within the sub-region MA1. An enlargement of the comparison region CA is described with reference to FIG. 3. In this Figure, there is the possibility of choosing the shape of the comparison region CA to be different from the square shown in FIG. 1. Also, for the sub-region MA1 shown, a matrix with more or fewer pixels P can be chosen and each comparison result CR can be processed in its own sub-region in accordance with the relation.

Examples of processing the comparison results CR signifying no motion in the sub-region of 64 pixels are the following threshold numbers for FIG. 3: thn1=0.9, thn2=0.95 and thn3=0.97 or thn1=57.6, thn2=60.8 and thn3=62.08. It follows for the estimation of the extent of motion that:

P/PT<0.5=no motion, code PC=000, 58 or more pixels P "no motion" are detected at the threshold number thn1=57.6.

0.5<P/PT<1.5=some motion, code PC=001

=or fewer pixels P "no motion" are detected at the threshold number thn1=57.6 and 61 or more pixels P "no motion" are detected at the threshold number thn2=60.8.

1.5<P/PT<2.5=more motion, code PC=011

60 or fewer pixels P "no motion" are detected at the threshold number thn2=60.8 and 63 or 64 pixels P "no motion" are detected at the threshold number thn3=62.08.

P/PT>2.5=even more motion, code PC=111

62 or fewer pixels P "no motion" are detected at the threshold number thn3=62.08.

Such a summary for the detection of pixels P "motion" with the corresponding threshold numbers thn1=0.1, thn2=0.05 and thn3=0.03 or thn1=6.4, thn2=3.2 and thn3=1.92 yields:

| | |
|---|---|
| P/PT < 0.5, Code PC = 000 | 6 or fewer pixels P "motion" are detected at the threshold number thn1 = 6.4. |
| 0.5 < P/PT < 1.5, Code PC = 001 | 7 or more pixels P "motion" are detected at the threshold number thn1 = 6.4 and 3 or fewer pixels P "motion" are detected at the threshold number thn2 = 3.2. |
| 1.5 < P/PT < 2.5 Code PC = 011 | 4 or more pixels P "motion" are detected at the threshold number thn2 = 3.2 and 1 or 0 pixels P "motion" are detected at the threshold number thn3 = 1.92. |
| P/PT < 2.5 Code PC = 111 | 2 or more pixels P "motion" are detected at the threshold number thn3 = 1.92. |

With both detection possibilities, the differentiation in the threshold numbers thn leads to an accurate estimation. A combination of both possibilities can also be used so that "no motion" is detected at the one threshold number and "motion" is detected at another threshold number.

Figure 4:
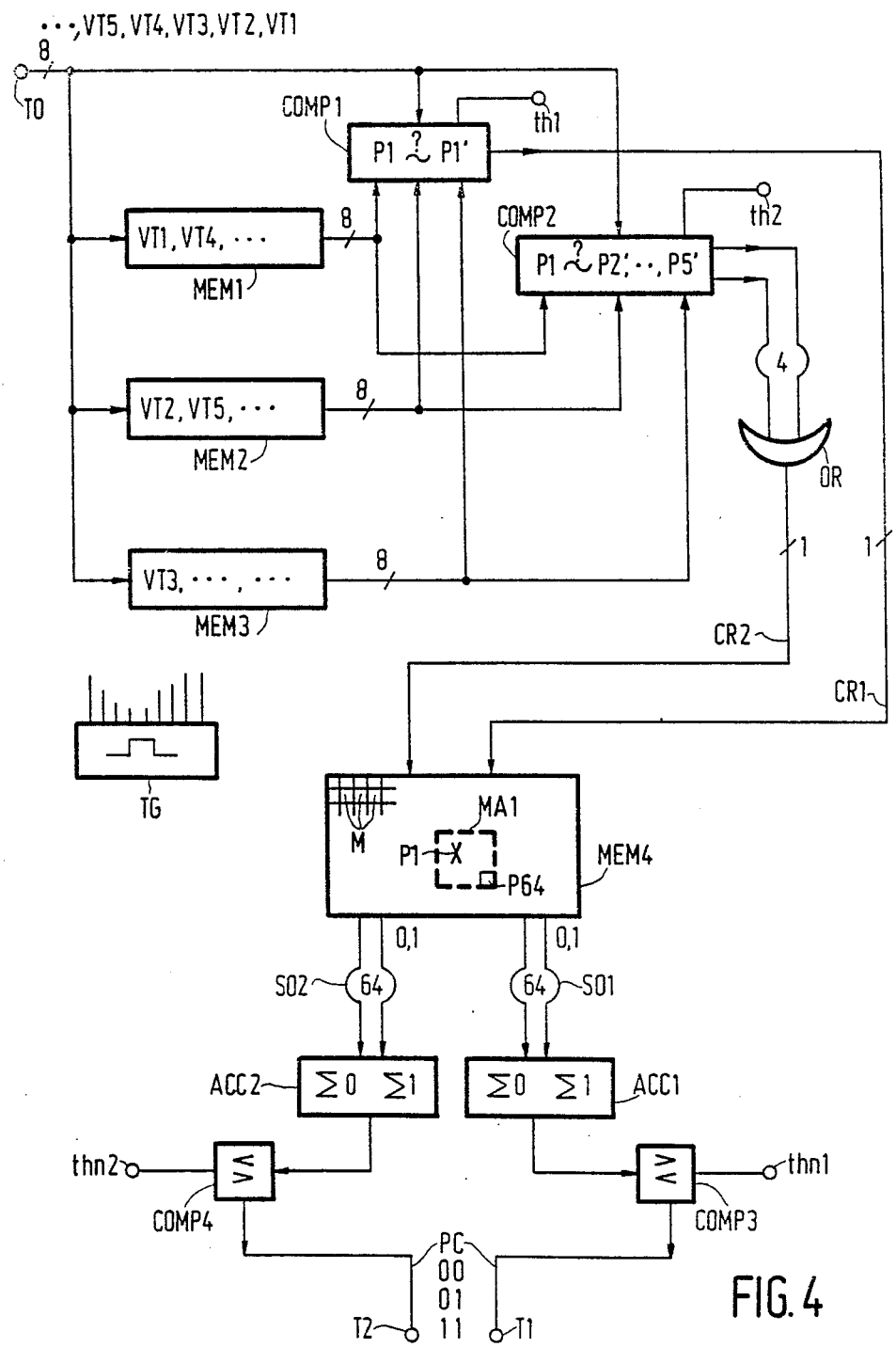
FIG. 4 is a block diagram of a device suitable for performing the method according to the invention.

FIG. 4 is a block diagram of a device suitable for performing the method according to the invention, which device is associated with FIG. 2. The reference T0 in FIG. 4 denotes an input of the device according to the invention to which an 8-bit digitized picture signal which is not further shown is applied. A number of successive field periods VT associated with the picture signal is indicated at the eightfold input T0 by means of VT1, VT2, VT3, VT4, VT5, . . . . It is assumed that the applied picture signal is associated with a single interlaced television picture. The input T0 is coupled to respective inputs of three memory devices MEM1, MEM2, and MEM3 and of two signal comparison-and-threshold circuits COMP1 and COMP2. Under the control of clock pulse signals (not shown) which are supplied, inter alia, by a time signal generator TG, the memory devices MEM receive the picture signals which occur in the field periods VT indicated in the devices MEM and the circuits COMP process the instantaneously applied picture signal. For the sake of simplicity, the connections between the time signal generator TG and the components to be controlled by this generator are omitted in the device of FIG. 4. Outputs (eightfold) of the devices MEM are coupled to inputs of the circuits COMP1 and COMP2. The circuit COMP1 receives the threshold value th1 and operates for the picture signal value comparison between the pixel P1 and the corresponding pixel P1' as is indicated in the circuit COMP1. The circuit COMP2 receives the threshold value th2 and operates in the manner shown for the picture signal value comparisons between the pixel P1 and the surrounding group of pixels P2', P3', P4' and P5'. The circuit COMP2 is shown with four outputs which are coupled to inputs at a gate circuit OR whose output thereby conveys the second comparison result CR2 which is associated with the motion detection "no motion". The circuit OR is shown separately for the sake of clarity, but it may be present in the circuit COMP2. The single output of the circuit COMP1 with the comparison result CR1 and that of the circuit OR with the comparison result CR2 are coupled to inputs of a memory device MEM4.

The comparison results CR1 and CR2 are obtained by means of the memory devices MEM1, MEM2 and MEM3 and the signal comparison-and-threshold circuits COMP1 and (COMP2, OR) by directly using the picture signal associated with a given field period, for example VT4, at the circuits COMP1 and COMP2 when this signal is applied to the input T0, while the picture signals associated with the field periods VT3 and VT2 are obtained from the respective memory devices MEM3 and MEM2. Simultaneously, the picture signal associated with the field period VT4 is stored in the memory device MEM1. The comparison of the picture signal associated with the field period VT4 whit the picture signals associated with the field periods VT2 as well as VT3 may lead to a non-optimum comparison in the case of ample presence of changing motion in the interlaced television picture PT. This is caused by the shifted information in the picture signal associated with the field period VT3. A so-called intraframe filter may be used as a remedy in processing the picture signal associated with the field period VT2, which filter ensures an interpolation to obtain intermediate lines. In this case, only the picture signal associated with the field period VT2 supplies the information for the comparison, and this both directly and in an interpolated manner. Furthermore, the threshold value th can be supplied by a circuit via which this threshold value is dependent on the extent of the changing motion, a motion-adaptive threshold value is then present.

The memory device MEM4 is shown with memory elements M for storing the comparison result CR1 (0 or 1) and CR2 (0 or 1) for each pixel P. In the memory device MEM4, the sub-region MA1 of FIG. 1 is shown with the instantaneous pixel P1 and the pixel P64 so as to clarify the operation. For the choice of the 8×8 matrix with the 64 pixels P, the memory device MEM4 should have two groups SO1 and SO2 of 64 outputs each. It is assumed that the groups of outputs SO1 and SO2 simultaneously conveys the comparison result CR1 (0 or 1) and CR2 (0 or 1), respectively, of the 64 pixels P. The groups of outputs SO1 and SO2 are coupled to inputs of accumulator circuits ACC1 and ACC2, respectively. Upon the detection "no motion" the logic 0's are summed (Σ0) and upon the detection "motion" the logic 1's (Σ1) are summed. The result of the one or the other summation is supplied at an output which is coupled to a comparison-and-threshold circuit COMP3 and COMP4, respectively, an input of which conveys the threshold numbers thn1 and thn2, respectively. In the circuits COMP3 and COMP4, the symbols > and < indicate that they may be operative in accordance with the relation Σ0>thn (detection "no motion") or Σ1<thn (detection "motion"). The circuits COMP3 and COMP4 each have outputs T1 and T2, respectively, which jointly convey the code PC which is available for further processing, like storage in a picture memory. The threshold numbers thn1 and thn2 may be present at the comparison-and-threshold circuits COMP3 and COMP4 in the form of a binary number or in the form of a given voltage value. Referring to the previously given code surveys, it follows for a decision possibility "no motion" that a 6-bit number is required, whereas a 3-bit number may suffice for "motion".

Figure 5:
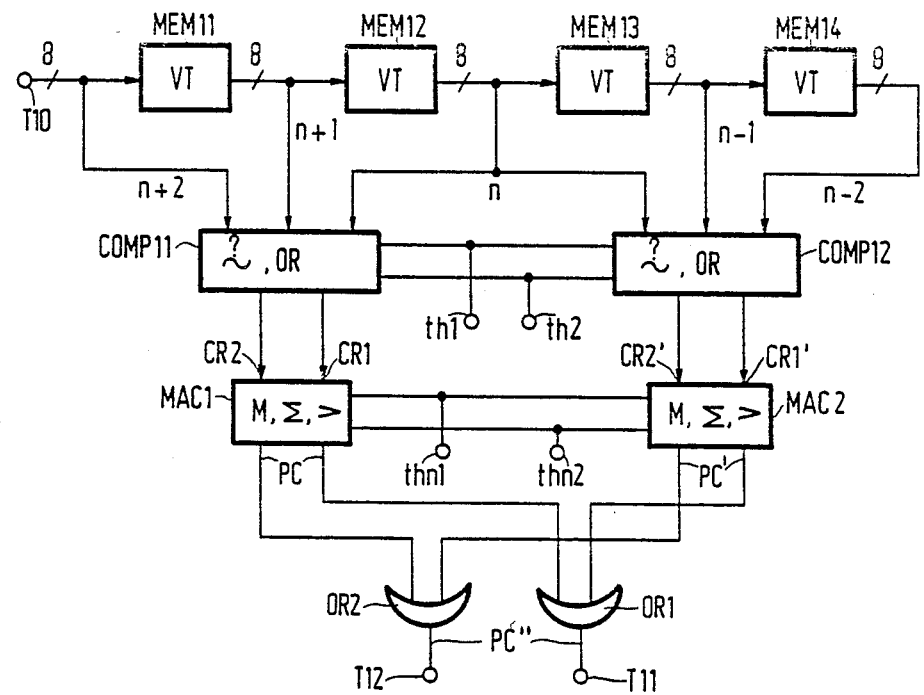
FIG. 5 shows a further embodiment of the device in which the previous and the subsequent television picture are utilized for the motion estimation.

The device according to FIG. 3 is operative with a previous television picture for the comparison. FIG. 5 is a block diagram of a device according to the invention in which the previous television picture as well as the subsequent one are used for the motion estimation. An eightfold input T10 is coupled to a series arrangement of four memory devices MEM11, MEM12, MEM13 and MEM14 which operate as delay devices each having a delay time of one field period VT. Starting from an instantaneous field denoted by n, the two previous fields n−1 and n−2 and the two subsequent fields n+1 and n+2 are simultaneously present for the processing operation. Both for the pixel-pixel comparison and the pixel-group comparison the fields, n, n+1 and n+2 are applied to a signal comparison-and-threshold circuit COMP11 at which the threshold values th1 and th2 are present. Similarly, the fields n, n−1 and n−2 are applied to an identical circuit COMP12. The circuits COMP11 and COMP12 supply the comparison results CR1 and CR2, and CR1' and CR2' to circuits MAC1 and MAC2, respectively, each comprising the memory device MEM4, the accumulator circuits ACC1 and ACC2 and, with the threshold numbers thn1 and thn2, the comparison-and-threshold circuits COMP3 and COMP4 of FIG. 4, which is illustrated by M, −, > in the circuits MAC. Corresponding outputs of the circuits MAC1 and MAC2 are connected to inputs of OR gate circuits OR1 and OR2, respectively, while outputs T11 and T13 of the respective circuits OR1 and OR2 convey a code PC". The duplicate motion estimation performed in accordance with FIG. 5 leads to a greater reliability of the estimation. At the duplicate estimation the logic OR function may not only be present after the circuits MAC but also before them. An economy in the described duplicate design of the device is the use of a single circuit MAC, but a drawback appears to be the greater sensitivity to noise.

We claim:

1. A method of estimating the extent of motion in a picture element (pixel) of a television picture, said method being based on picture signal value comparisons between pixels in successive television pictures in which, starting with a present pixel in a present television picture, the picture signal value of said present pixel is compared with that of a corresponding pixel in a previous and/or subsequent television picture, and with that of a plurality of surrounding pixels in the present television picture, and in which the extent of motion in said present pixel is established dependent on a number of comparison results exceeding or not exceeding a threshold value, said number being obtained by means of the picture signal value comparisons, characterized in that said method comprises the steps:

comparing the difference between the picture signal values of said present pixel and said corresponding pixel with a first threshold value, motion being indicated by said difference exceeding said first threshold value;

comparing the difference between the picture signal values of said present pixel and each of said surrounding pixels with a second threshold value, motion only being indicated by all of said differences exceeding said second threshold value;

storing the results of the above comparing steps as a first and a second comparison result signifying no motion and motion, respectively, for the pixels of the television picture;

repeating the above comparing and storing steps for a sub-region of a number of pixels surrounding said present pixel thereby forming a matrix of first and second comparison results;

separately determining the number of first and second comparison results indicating no motion and motion and dividing each of the four determined numbers by the number of pixels in said sub-region;

comparing the two determined numbers for the first comparison results with a first threshold number and comparing the two determined numbers for the second comparison results with a second threshold number; and deciding the extent of motion at said present pixel dependent on the combinations of the first and the second threshold numbers be exceeded or not exceeded by said determined numbers.

2. A method as claimed in claim 1, characterized in that the method is performed for at least another sub-region having a larger plurality of surrounding pixels than said sub-region, leading to at least a third comparison result, a sub-region processing with at least a third threshold number and an extension of the said combinations by at least one further combination.

3. A method as claimed in claim 1 or 2, characterized in that the said threshold value are of the order of 0.01 to 0.5 of the peak-to-peak value of the picture signal.

4. A method as claimed in claim 2, characterized in that the said threshold numbers, which are parts of the said total number and are associated with the first, second, etc. comparison results signifying no motion or motion, are larger or smaller, respectively, in that sequence.

5. A method as claimed in claim 4, characterized in that the said threshold numbers in the sequence are of the order of 0.9, 0.95, 0.97, 0.98, etc. and 0.1, 0.05, 0.03, 0.02, etc., respectively.

6. A device for estimating the extent of motion in a picture element (pixel) of a television picture, said estimation being based on picture signal value comparisons between pixels in successive television pictures in which, starting with a present pixel in a present television picture, the picture signal value of said present pixel is compared with that of a corresponding pixel in a previous and/or subsequent television picture, and with that of a plurality of surrounding pixels in the present television picture, and in which the extent of motion in said present pixel is established dependent on a number of comparison results exceeding or not exceeding a threshold value, said number being obtained by means of the picture signal value comparisons, said device comprising at least one memory device for storing or delaying the picture signal values of the pixels of a television picture, and at least a first and a second signal comparison-and-threshold circuit coupled to the memory device for performing the picture signal value comparisons between said present pixel, said corresponding pixel and the plurality of surrounding pixels, respectively, characterized in that said device further comprises:

a further memory device which is coupled to outputs of at least the first and second signal comparison-and-threshold circuits for storing at least the first and second comparison results, respectively, per pixel for a sub-region of a plurality of pixels surrounding said present pixel, said further memory device having at least a first and a second group of a number of outputs associated with the matrix of the pixels of the sub-region;

a first and a second accumulator circuit coupled, respectively, to said first and second groups of outputs of said further memory device, for, each time, accumulating the number of pixels signifying no motion and signifying motion, respectively; and third and fourth comparison-and-threshold circuits coupled, respectively, to outputs of said first and second accumulator circuits, operating in accordance with said relation, at least one output of the third comparison-and-threshold circuit and one output of the fourth comparison-and-threshold circuit conveying the combination as a code.

7. A device as claimed in claim 6, characterized in that the first mentioned memory device is suitable for supplying the picture signal values of the pixels of the previous and the subsequent television picture, and in that the device further comprises a duplicate of the further memory device and at least in part with said circuits for processing both said previous and subsequent television pictures, the duplicate parts of the device being coupled by a logic OR function for both the first and the second comparison results.

* * * * *